(12) United States Patent
Uchino

(10) Patent No.: US 8,016,347 B2
(45) Date of Patent: Sep. 13, 2011

(54) FRONT STRUCTURE OF AUTOMOBILE HOOD

(75) Inventor: Keiichi Uchino, Kariya (JP)

(73) Assignee: Toyota Shatai Kabushiki Kaisha, Aichi-Ken (JP)

( * ) Notice: Subject to any disclaimer, the term of this patent is extended or adjusted under 35 U.S.C. 154(b) by 0 days.

(21) Appl. No.: 12/516,535

(22) PCT Filed: Jul. 10, 2007

(86) PCT No.: PCT/JP2007/063718
§ 371 (c)(1),
(2), (4) Date: Jul. 8, 2009

(87) PCT Pub. No.: WO2009/008060
PCT Pub. Date: Jan. 15, 2009

(65) Prior Publication Data
US 2010/0181803 A1   Jul. 22, 2010

(51) Int. Cl.
*B62D 25/10* (2006.01)
(52) U.S. Cl. ............ 296/193.11; 296/187.04; 180/69.21
(58) Field of Classification Search ............. 296/193.11, 296/187.04; 180/69.2, 69.21
See application file for complete search history.

(56) References Cited

U.S. PATENT DOCUMENTS

| 7,055,894 | B2 * | 6/2006 | Ikeda et al. | 296/187.09 |
| 7,296,845 | B2 * | 11/2007 | Seksaria et al. | 296/146.6 |
| 7,497,508 | B2 * | 3/2009 | Wallman et al. | 296/193.11 |
| 7,597,384 | B2 * | 10/2009 | Wallman et al. | 296/187.04 |
| 2010/0140979 | A1 * | 6/2010 | Seksaria et al. | 296/193.11 |

FOREIGN PATENT DOCUMENTS

| DE | 10308371 A1 * | 9/2004 |
| JP | 10-045037 | 2/1998 |
| JP | 2004-50909 | 2/2004 |
| JP | 2005-119512 | 5/2005 |
| JP | 2005-125831 | 5/2005 |
| JP | 2005-343279 A | 12/2005 |
| JP | 2006-306237 A | 11/2006 |
| JP | 2007-30737 A | 2/2007 |
| JP | 2007-223414 A * | 9/2007 |
| WO | WO 2005/120908 A1 | 5/2005 |

* cited by examiner

*Primary Examiner* — Jason S Morrow
(74) *Attorney, Agent, or Firm* — Patterson Thuente Christensen Pedersen P.A.

(57) ABSTRACT

In a front structure of a vehicle hood, a dent preventive reinforcement is connected to an outer panel and an inner panel. The dent preventive reinforcement is formed as a plate-shaped member that is disposed in the vehicle widthwise direction between the panels while vertically extending with respect to both of the panels. Respectively formed in vertical wall portions of the dent preventive reinforcement are stress-focusing portions to which stress can be concentrated. When an impact load is applied to an outer surface of the outer panel from outside of a vehicle body, the vertical wall portions of the dent preventive reinforcement is bent at the stress-focusing portions, so that the impact load can be absorbed.

3 Claims, 4 Drawing Sheets

FRONT STRUCTURE OF AUTOMOBILE HOOD

PRIORITY CLAIM

The present application is a National Phase entry of PCT Application No. PCT/JP2007/063718, filed Jul. 10, 2007, the disclosure of which is hereby incorporated by reference herein in its entirety.

TECHNICAL FIELD

The present invention relates to a front structure of a vehicle hood. The vehicle hood is attached to a vehicle body so as to open and close a vehicle engine room, and has an outer panel and an inner panel.

BACKGROUND ART

A front structure of a conventional vehicle hood is shown in FIGS. 5 and 6. FIG. 5 is a longitudinal cross-sectional view of a vehicle, which illustrates the front structure 100 of the conventional vehicle hood. FIG. 6 is a longitudinal cross-sectional view, which illustrates a condition in which an impactor S collides with an outer surface of an outer panel 20 in FIG. 5. As shown in FIG. 5, the hood 10 includes an outer panel 20 that is gently curved leftwardly and downwardly in FIG. 5, and an inner panel 30 that is affixed to a front end of the outer panel 20. A striker 50 is attached to a flattened portion 33 of the inner panel 30. The striker 50 is capable of engaging a hood lock 40 provided to a vehicle body when the hood 10 closes an engine room. Also, a hood lock reinforcement 60 and a dent preventive reinforcement 90 are disposed between the outer panel 20 and the inner panel 30. The hood lock reinforcement 60 is intended to reinforce an attachment portion of the striker 50. The dent preventive reinforcement 90 is intended to prevent the outer panel 20 from denting when a normal load is applied to thereto from outside of the vehicle body. Both of the members 60 and 90 are connected to each other at end portions thereof by spot welding. Further, an upper portion of the dent preventive reinforcement 90 is bonded to the outer panel 20 via an adhesive member 80 which is referred to as a mastic sealer.

However, in the front structure of the conventional vehicle hood, the following problem has been pointed out. That is, in the front structure 100 of the conventional vehicle hood shown in FIG. 5, the dent preventive reinforcement 90 is connected to an upper surface of the hood lock reinforcement 60 in the form of a cover. As a result, as shown in FIG. 6, when a large impact load F is applied to an outer surface of the outer panel 20 from above, the outer panel 20 can be deformed and at the same time, the dent preventive reinforcement 90 can be deformed in an impact load application direction (a direction shown by arrow in FIG. 6). However, deformation of the dent preventive reinforcement 90 can be performed while an upper surface portion 90a thereof is flexed and tensed. Therefore, the deformation of the dent preventive reinforcement 90 in the impact load application direction is relatively small. Thus, the problem that has been pointed out is that in the front structure 100 of the conventional vehicle hood, displacement amount of the dent preventive reinforcement 90 in the impact load application direction is small.

Therefore, there is a need in the art to increase the displacement amount of the dent preventive reinforcement in the impact load application direction when the impact load is applied to the outer surface of the outer panel.

SUMMARY OF THE INVENTION

The present invention relates to a front structure of a vehicle hood that is attached to a vehicle body so as to open and close a vehicle engine room. In one aspect of the present invention, the vehicle hood includes an outer panel forming an ornamental surface of the vehicle body and an inner panel supporting the outer panel from inside of the vehicle body. A hood lock reinforcement and a dent preventive reinforcement are respectively disposed in a vehicle widthwise direction between the outer panel and the inner panel. The hood lock reinforcement is intended to reinforce an attachment portion of a striker that is capable of engaging a hood lock provided to the vehicle body, and the dent preventive reinforcement is intended to prevent the outer panel from denting caused by a normal load applied from outside. The dent preventive reinforcement is deformed when an impact load greater than the normal load is applied to an outer surface of the outer panel, so that the impact load can be absorbed. The dent preventive reinforcement includes a vertical wall portion extending from the inner panel toward the outer panel. The vertical wall portion is provided with a stress-focusing portion for the impact load, and the vertical wall portion is bent at the stress-focusing portion, so that the impact load can be absorbed.

According to the aspect, the dent preventive reinforcement disposed in the vehicle widthwise direction includes the vertical wall portion extending from the inner panel toward the outer panel. The vertical wall portion is provided with the stress-focusing portion. Therefore, when a striker of a vehicle hood engages the hood lock provided to the vehicle body, the dent preventive reinforcement can be easily bent in the vehicle longitudinal direction at the stress-focusing portion. When the impact load is applied to the outer surface of the outer panel from outside, the outer panel is deformed in an impact load application direction. At this time, the vertical wall portion of the dent preventive reinforcement can be bent at the stress-focusing portion. That is, the vertical wall portion of the dent preventive reinforcement is bent and deformed (buckled) at the stress-focusing portion. As a result, displacement amount of the dent preventive reinforcement in the impact load application direction is greater than the conventional structure.

In another aspect, the dent preventive reinforcement includes front and rear vertical wall portions and is formed to a hat-shape in cross section. The front and rear vertical wall portions is respectively provided with stress-focusing portions. The stress-focusing portions are arranged such that displacement of the front vertical wall portion and the rear vertical wall portion caused by bending thereof can be prevented from interfering with each other.

According to the aspect, the dent preventive reinforcement formed to the hat-shape in cross section can be bent while one of the front and rear vertical wall portions in the hat-shape does not affect (interfere with) the other of the vertical wall portions. Thus, when the dent preventive reinforcement is bent at the stress-focusing portions, bending action thereof can be smoothly performed.

In a further aspect, when the impact load is applied to the outer surface of the outer panel from outside of the vehicle body, the dent preventive reinforcement can be bent while a bending position of the dent preventive reinforcement that is disposed between the panels as a plate-shaped member is maintained constant.

According to the aspect, even when the impact load is applied to the outer surface of the outer panel from outside, the dent preventive reinforcement can be bent while the bending position thereof is not changed. Thus, the bending action of the dent preventive reinforcement can be smoothly performed.

The present invention using the means described above has following effects.

First, in the first invention, when the impact load is applied to the outer surface of the outer panel, displacement amount of the dent preventive reinforcement in the impact load application direction can be increased. Further, the impact load can be reliably absorbed due to bending action of the dent preventive reinforcement.

Next, according to the second invention, the impact load can be more reliably absorbed.

Further, according to the third invention, because the bending action of the dent preventive reinforcement can be smoothly performed, the impact load can be suitably absorbed.

DETAILED DESCRIPTION OF THE INVENTION

In the following, the best mode for carrying out the present invention is described with reference to the drawings.

Figure 4:
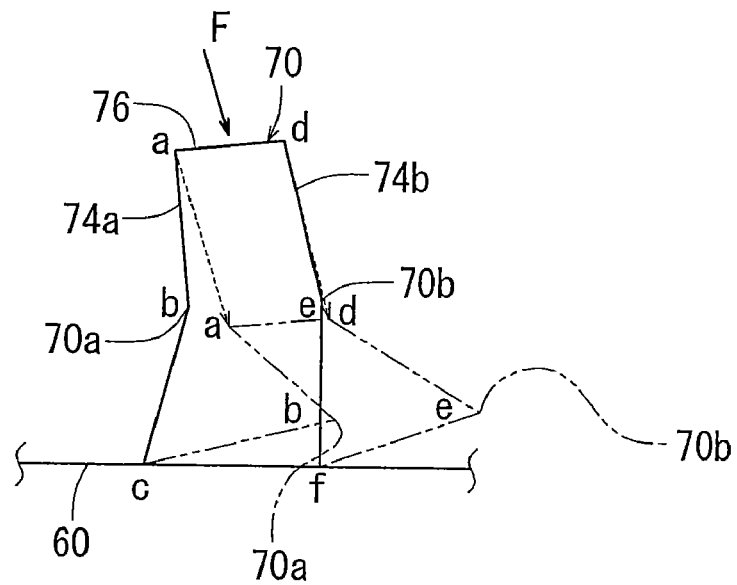
FIG. 4(A) is an explanatory view, which illustrates operation of a dent preventive reinforcement.
FIG. 4(B) is an explanatory view, which illustrates operation of a modified dent preventive reinforcement.
Figure 4:
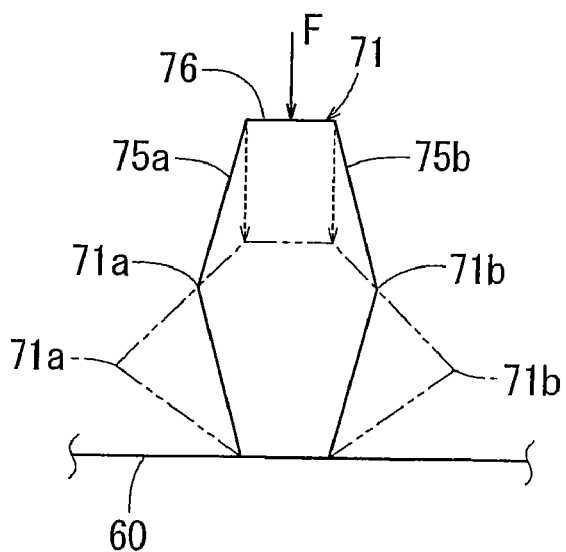
Figure 5:
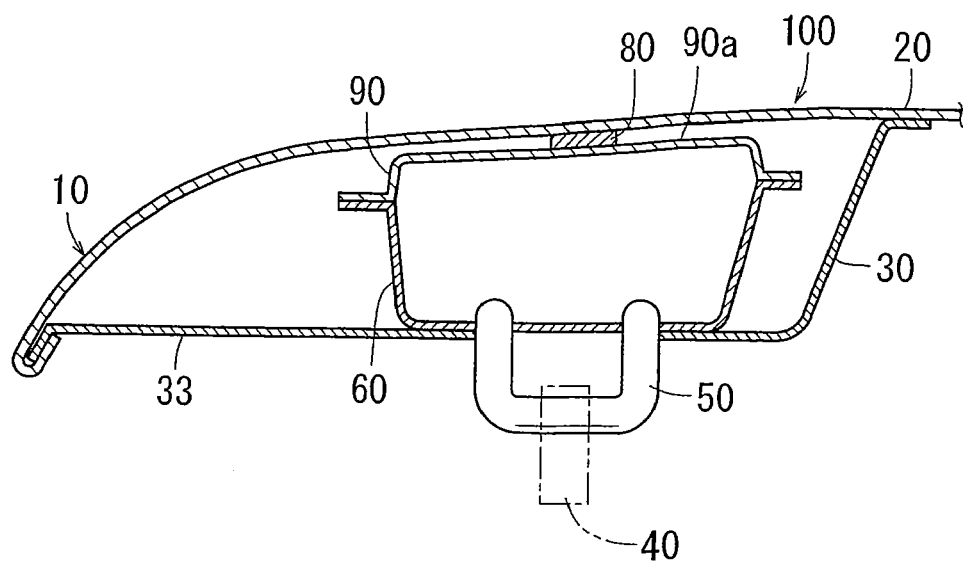
FIG. 5 is a longitudinal cross-sectional view, which illustrates a front structure of a conventional vehicle hood.
Figure 6:
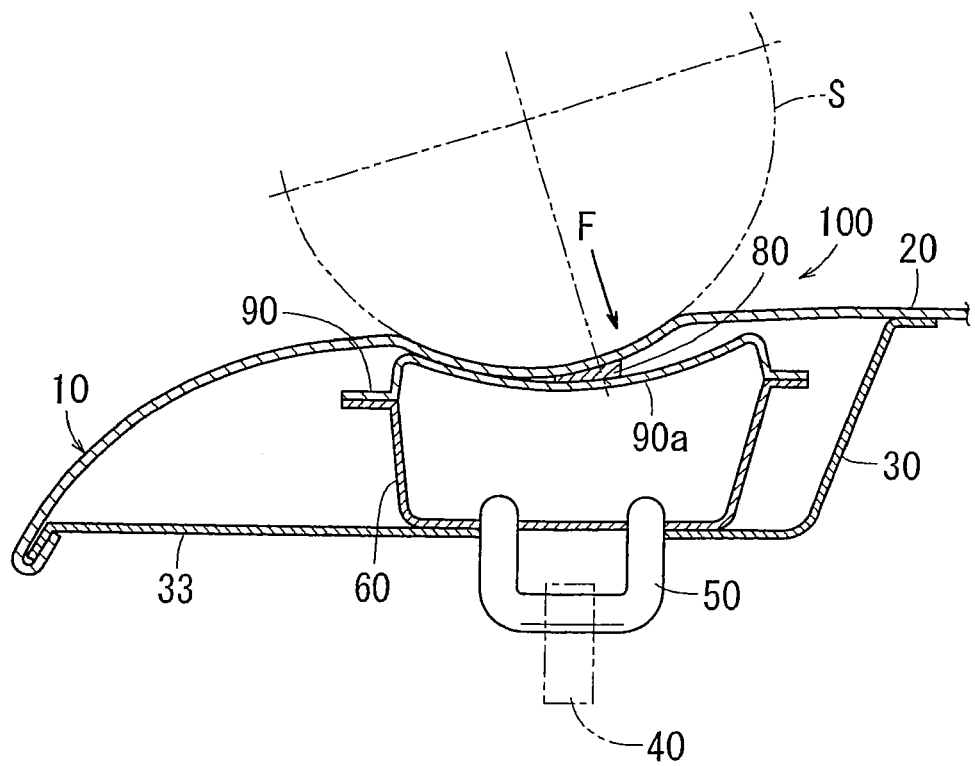
FIG. 6 is a longitudinal cross-sectional view, which illustrates a condition in which an impactor collides with an outer surface of an outer panel in FIG. 5.

In FIG. 4(A), chain double-dashed lines illustrate a condition in which the dent preventive reinforcement 70 is deformed. Similarly, in FIG. 4(B), chain double-dashed lines illustrate a condition in which the dent preventive reinforcement 71 is deformed. Further, in FIG. 1, forward and rearward, rightward and leftward, and upward and downward respectively correspond to forward and rearward, rightward and leftward, and upward and downward of the vehicle.

The embodiment described below is particularly characterized by the dent preventive reinforcement 70. Therefore, elements that are the same in the conventional structure will be identified by the same reference numerals and a detailed description of such elements may be omitted.

Figure 1:
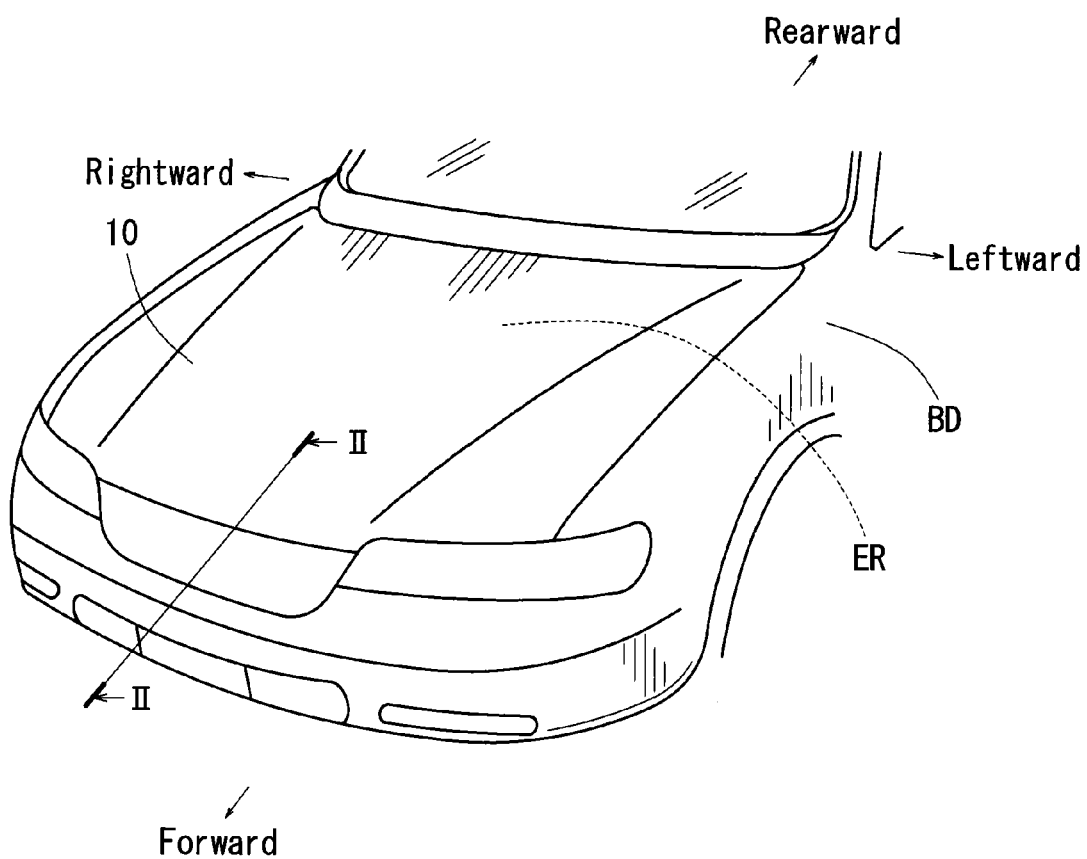
FIG. 1 is a perspective view of a front portion of a vehicle having a vehicle hood according to the present embodiment.
Figure 2:
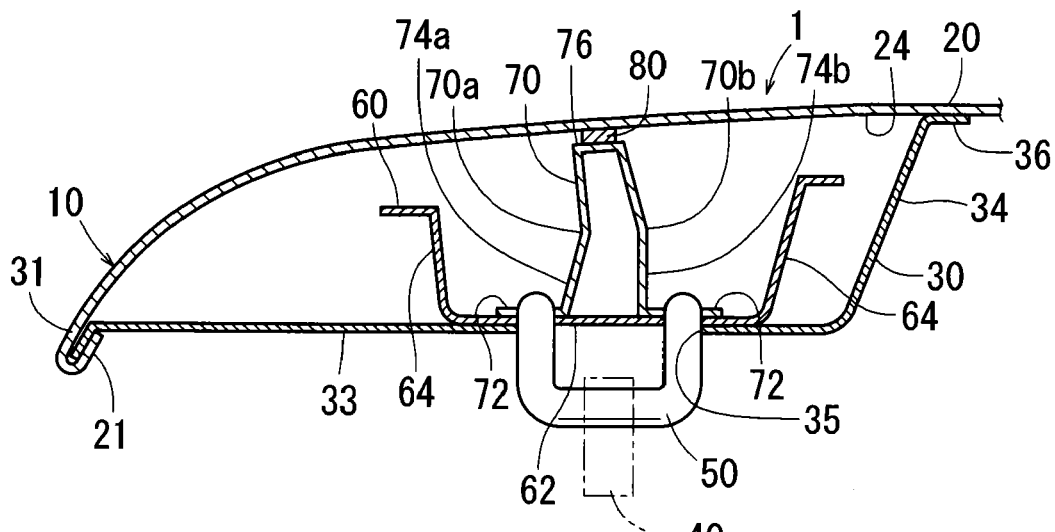
FIG. 2 is a longitudinal cross-sectional view (a cross-sectional view taken along line II-II in FIG. 1), which illustrates a front structure of the vehicle hood according to the present embodiment.

As shown in FIG. 1, a vehicle hood 10 is vertically rotatably attached to a vehicle body BD at rear side ends thereof, so as to open and close an engine room ER disposed on the vehicle body BD. Further, as shown in FIG. 2, the vehicle hood 10 includes an outer panel 20 that forms an ornamental surface of the vehicle body BD, and an inner panel 30 that can support the outer panel 20 from inside. A hood lock reinforcement 60 and a dent preventive reinforcement 70 are disposed between the outer panel 20 and the inner panel. The hood lock reinforcement 60 is intended to reinforce an attachment portion of a striker 50 that is capable of engaging a hood lock 40 provided to the vehicle body. The dent preventive reinforcement 70 is intended to prevent the outer panel from denting when a normal load is applied thereto from outside of the vehicle body. Further, "the normal load" means a load that can be just produced by lightly pushing with the hand and not a large load that can be produce by colliding with an object. In a front structure 1 of the vehicle hood according to the present embodiment, when an impact load from outside of the vehicle body BD is applied to an outer surface of the outer panel 20 at a portion corresponding to the dent preventive reinforcement 70, the outer panel 20 can be deformed and at the same time, the dent preventive reinforcement 70 can be subjected to plastic deformation, so as to absorb the impact load.

As shown in FIGS. 1 and 2, the outer panel 20 is formed such that a forward end portion thereof is gently curved downwardly. A front end periphery 21 of the outer panel 20 is bent inwardly, so that a front end periphery 31 of the inner panel 30 can be secured within the front end periphery 21.

As shown in FIG. 2, the inner panel 30 has a plate-shaped flattened portion 33 that is positioned to be opposite to the outer panel 20. A front end portion of the flattened portion 33 is slightly bent, thereby forming the front end periphery 31. A rear end portion of the flattened portion 33 is formed with an inclined wall portion 34 by bending. A rear upper end periphery 36 of the inclined wall portion 34 is adjoined and secured to an inner surface 24 of the outer panel 20.

Further, an opening portion 35 is formed in the flattened portion 33 of the inner panel 30. The opening portion 35 is positioned at a substantially central portion in a vehicle widthwise direction. The striker 50 is positioned in the opening portion 35 and is projected downwardly therethrough, so as to engage the hood lock 40 when the hood 10 is closed.

As shown in FIG. 2, the hood lock reinforcement 60 includes a bottom plate portion 62 and vertical plate portions 64, and is formed to a substantially U-shape in cross section. The bottom plate portion 62 is secured to an upper surface of the inner panel 30, and the vertical plate portions 64 are respectively positioned at front an rear portions of the bottom plate portion 62. The striker 50 described above is secured to the bottom plate portion 62.

As shown in FIG. 2, the dent preventive reinforcement 70 includes flanged portions 72 and 72, vertical wall portions 74a and 74b and a top portion 76, and is formed to a hat-shape in cross section. The flanged portions 72 and 72 are secured to an upper surface of the bottom plate portion 62 of the hood lock reinforcement 60. The vertical wall portions 74a and 74b are vertically projected from the flanged portions 72 and 72 toward the outer panel 10. The top portion 76 connects the vertical wall portions 74a and 74b. The top portion 76 is connected to the inner surface 24 of the outer panel 20 at an upper surface thereof via an adhesive member 80 which is referred to as a mastic sealer. Thus, the dent preventive reinforcement 70 is connected to the outer panel 20 via the adhesive member 80 and is connected to the inner panel 30 via the hood lock reinforcement 60. Therefore, when the impact load is applied to the outer surface of the outer panel 20 from outside of the vehicle body BD, the dent preventive reinforcement 70 connected to the outer panel 20 can directly absorb the impact load.

Also, the dent preventive reinforcement 70 is formed as a plate-shaped member that extends in the vehicle widthwise direction between the outer panel 20 and the inner panel 30 while vertically extending with respect to both of the panels 20 and 30. As shown in FIG. 2, in this embodiment, the vertical wall portions 74a and 74b of the dent preventive reinforcement 70 are arranged to vertically extend with respect to both of the panels 20 and 30. Further, the term "vertically" may include both of the meaning of perpendicular to the outer panel 20 and the inner panel 30 and the meaning of substantially perpendicular thereto.

Figure 3:
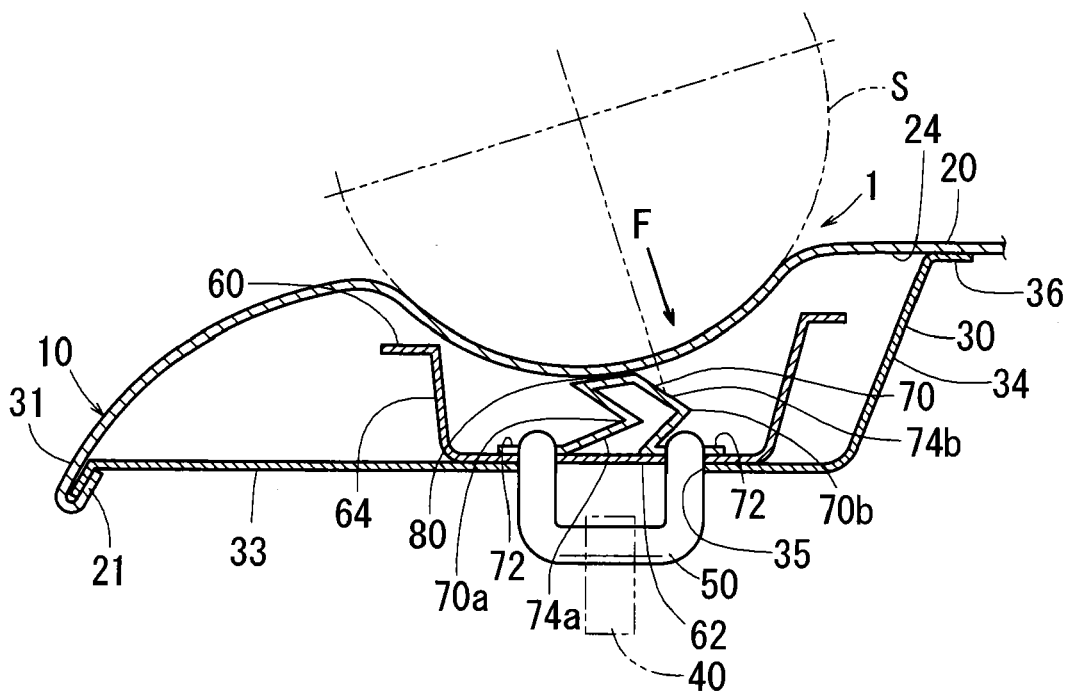
FIG. 3 is a cross-sectional view, which illustrates a condition in which an impactor collides with an outer surface of an outer panel in FIG. 2.

Further, stress-focusing portions 70a and 70b are respectively formed in central portions of the vertical wall portions 74a and 74b of the dent preventive reinforcement 70, so that stress can be concentrated thereto when the impact load is applied from outside of the vehicle body BD. The stress-focusing portions 70a and 70b are linearly formed in the vehicle widthwise direction. As shown in FIG. 2, in this embodiment, the stress-focusing portions 70a and 70b are formed in front and rear portions of the hat-shaped dent preventive reinforcement 70, i.e., the vertical wall portions 74a and 74b. As a result, as shown in FIG. 3, when the impact load F is applied from outside of the vehicle body BD, the vertical wall portions 74a and 74b can be bent rearwardly in a vehicle longitudinal direction. Further, in this embodiment, the stress-focusing portions 70a and 70b are formed by slightly bending the vertical wall portions 74a and 74b rearwardly. However, the stress-focusing portions 70a and 70b can be formed by forming thin grooves, notches or the like in the vertical wall portions 74a and 74b.

Next, behavior of the dent preventive reinforcement 70 will be described. Further, the description will be made on the assumption that the striker 50 of the hood 10 engages the hood lock 40 provided to the vehicle body BD. As shown in FIG. 3, for example, when an impactor S collides with the outer surface of the outer panel 20, the impact load F is applied to the outer surface of the outer panel 20 in a direction shown by arrow in FIG. 3. Further, if the impactor S is a head of a pedestrian, it has been known that a colliding direction can generally make an angle between 50 degree and 65 degree to the ground.

When the impact load F is applied to the outer surface of the outer panel 20 from outside of the vehicle body BD, the impact load F is applied to the dent preventive reinforcement 70 via the outer panel 20. As previously described, the dent preventive reinforcement 70 has the stress-focusing portions 70a and 70b that are linearly formed in the vehicle widthwise direction, so that the stress can be concentrated thereto. Therefore, the impact load F can be concentrated to the stress-focusing portions 70a and 70b. As a result, when the outer panel 20 is deformed in an impact load application direction, the dent preventive reinforcement 70 connected to the outer panel 20 can be bent rearwardly in the vehicle longitudinal direction at the stress-focusing portions 70a, so that the impact load F can be absorbed. Thus, unlike the conventional structure in which the impact load is absorbed due to flexing action of the upper surface portion 90a of the dent preventive reinforcement 90, the vertical wall portions 74a and 74b of the dent preventive reinforcement 70 are bent (buckled) at the stress-focusing portions 70a and 70b and as a result, the impact load can be absorbed. Therefore, displacement amount of the dent preventive reinforcement 70 is greater than the conventional structure. Further, if the impactor S is the head of the pedestrian, decelerating (negative acceleration) applied to the head can be avoided from increasing. As a result, a head injury criterion (HIC) can be reduced. In other words, because the impact load can be reliably absorbed due to bending action of the dent preventive reinforcement 70. This may lead to reliable pedestrian protection measures.

Further, in this embodiment, when the impact load F is applied to the outer surface of the outer panel 20 from outside of the vehicle body BD, the dent preventive reinforcement 70 is bent in the vehicle longitudinal direction at the stress-focusing portions 70a and 70b that are formed as bending positions in the vertical wall portions 74a and 74b. At this time, bending deformation in the vehicle longitudinal direction can be prevented from interfering with each other. That is, in FIG. 3, when the vertical wall portion 74a is bent rearwardly in the vehicle longitudinal direction (rightwardly in FIG. 3), the vertical wall portion 74a does not contact the vertical wall portion 74b. In other words, the vertical wall portion 74a can be prevented from contacting the vertical wall portion 74b, so that bending action of the vertical wall portion 74a cannot be precluded by the vertical wall portion 74b. As a result, the impact load F can be more reliably absorbed.

Further, in this embodiment, when the impact load F is applied to the outer surface of the outer panel 20 from outside of the vehicle body BD, the dent preventive reinforcement 70 can be bent while the bending positions of the vertical wall portions 74a and 74b of the dent preventive reinforcement 70 are maintained constant. In particular, as shown in FIG. 4(A), when the impact load F is applied from outside of the vehicle body BD, the stress-focusing portions 70a and 70b can be displaced rightwardly and downwardly in FIG. 4(A). However, lengths of sides of the dent preventive reinforcement 70 in cross section remain unchanged. In FIG. 4(A), the dent preventive reinforcement 70 can be displaced in a folding manner while the lengths of the sides ab, bc, ad, de and of remain unchanged before and after the impact load is applied from outside of the vehicle body BD. Therefore, the bending action of the dent preventive reinforcement can be smoothly performed. As a result, the impact load can be suitably absorbed.

The present invention is not limited to the embodiment described above and the invention can be performed in various forms.

For example, in the front structure 1 of the vehicle hood according to the embodiment described above, the dent preventive reinforcement 70 is formed to the hat-shape in cross section and includes the two vertical wall portions 74a and 74b. However, the invention is not limited to this construction. That is, the dent preventive reinforcement 70 can be constructed of a single vertical wall portion. According to such construction, the dent preventive reinforcement 70 can be simplified.

Further, as shown in FIG. 4(B), the dent preventive reinforcement 71 can be modified so as to have vertical wall portions 75a and 75b that are formed to a gate-shape in cross section. The gate-shaped vertical wall portions 75a and 75b are outwardly bent, thereby forming stress-focusing portions 71a and 71b that are outwardly projected. In this construction, when the impact load F is applied from outside of the vehicle body BD, the stress-focusing portion 71a can be projected leftwardly in FIG. 4(B) and the stress-focusing portion 71b can be projected rightwardly in FIG. 4(B). Thus, the dent preventive reinforcement 71 can be bent downwardly in FIG. 4(B) in a collapsing manner. In this construction, when the impact load is applied in a direction perpendicular to the ground, the impact load can be suitably absorbed.

In addition, in the front structure 1 of the vehicle hood according to the embodiment described above, the dent preventive reinforcement 70 is connected to the outer panel 20 at an upper portion thereof via the adhesive member 80. However, the invention is not limited to this construction. That is, the dent preventive reinforcement 70 can be connected to the outer panel 20 at the upper portion thereof by welding.

The invention claimed is:

1. A front structure of a vehicle hood that is attached to a vehicle body so as to open and close a vehicle engine room, the vehicle hood comprising an outer panel forming an ornamental surface of the vehicle body and an inner panel supporting the outer panel from inside of the vehicle body, wherein a hood lock reinforcement and a dent preventive reinforcement are respectively disposed in a vehicle widthwise direction between the outer panel and the inner panel, the hood lock reinforcement being intended to reinforce an attachment portion of a striker that is capable of engaging a hood lock provided to the vehicle body, and the dent preventive reinforcement being intended to prevent the outer panel from denting caused by a normal load applied from outside, wherein the dent preventive reinforcement is deformed when an impact load greater than said normal load is applied to an outer surface of said outer panel, so that the impact load can be absorbed, wherein the hood lock reinforcement is constructed of a bottom plate portion secured to an upper surface of the inner panel and vertical plate portions respectively positioned at front and rear portions of the bottom plate portion, so as to have a substantially U-shape in cross section, and wherein the dent preventive reinforcement is constructed of front and rear flanged portions secured to an upper surface of the bottom plate portion of the hood lock reinforcement, front and rear vertical wall portions vertically projected from the flanged portions toward the outer panel and a top portion connecting the vertical wall portions, so as to have a hat-shape in cross section, and is positioned just above the striker.

2. The front structure of a vehicle hood as defined in claim 1, wherein the dent preventive reinforcement is adhered to a lower surface of the outer panel.

3. The front structure of a vehicle hood as defined in claim 1, wherein the front and rear vertical wall portions of the dent preventive reinforcement are respectively provided with stress-focusing portions.

* * * * *